March 20, 1951 A. PUCHALSKY 2,546,109
SEAT COVER
Filed Nov. 5, 1949
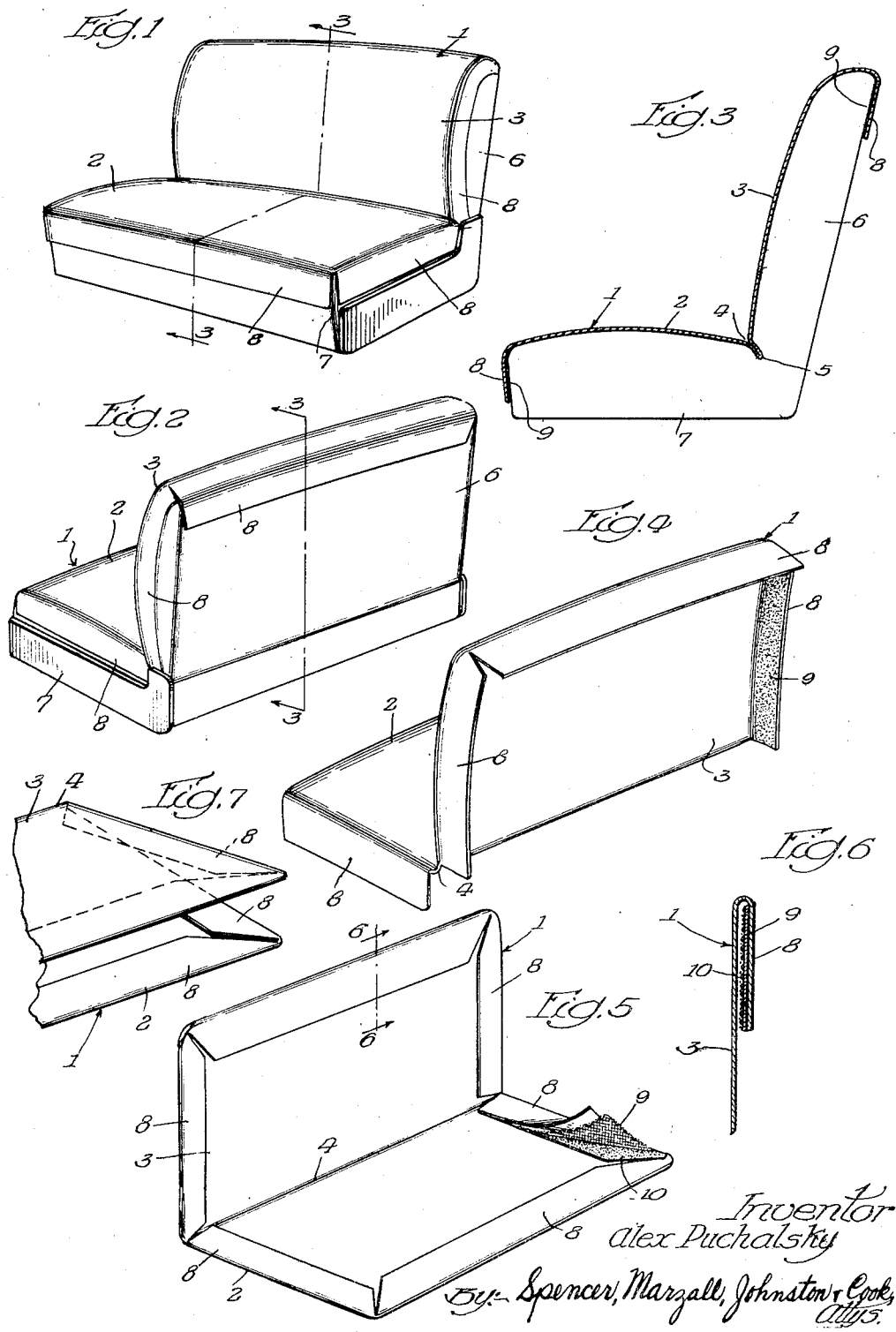
Inventor
Alex Puchalsky
By Spencer, Marzall, Johnston & Cook
Attys.

Patented Mar. 20, 1951

2,546,109

UNITED STATES PATENT OFFICE 2,546,109

SEAT COVER

Alex Puchalsky, Chicago, Ill.

Application November 5, 1949, Serial No. 125,695

1 Claim. (Cl. 155—182)

This invention relates to covers for cushions, including the seat, back and arm rests.

The primary object of the invention is the provision of cushion covers which may be made readily at a low cost and which may be quickly adn neatly applied by even the most inexperienced person without aid or assistance of others or without the use of nails, screws, glue or the other usual appurtenances normally required for applying the covers.

Another important object resides in the provision of an improved cushion cover which is provided with a protected adhesive surface so that the cover may be held in applied position by sticking the cover in place after a protective fabric member has been removed from the adhesive surface.

A still further object of the invention resides in the provision of a cushion cover which may be stuck to the fabric covering of the cushion.

Still another object of the invention is an improved method of applying covers to cushions which comprises the application of an adhesive on the underside of a cover and applying the adhesive in direct contact with the covering of a cushion to secure the cover to the cushion.

Numerous other objects and advantages will be apparent throughout the progress of the specification which follows:

The accompanying drawing illustrates a selected embodiment of the invention and the views therein are as follows:

Fig. 1 is a detail perspective view showing the front and one side of an automobile cushion having a seat part and a back part or rest, the cover of the invention being shown applied in position.

Fig. 2 is a view similar to Fig. 1 but showing the rear and one side of the automobile cushion.

Fig. 3 is a vertical sectional view on the line 3—3 of Figs. 1 and 2;

Fig. 4 is a detail perspective view of the cover of the invention;

Fig. 5 is a detail perspective view of the cover of the invention, the underside being shown, and parts broken away for the sake of clearness;

Fig. 6 is a detail sectional view on the line 6—6 of Fig. 5; and

Fig. 7 is a detail perspective of the cover showing the manner in which the cover may be folded for stacking, storing and shipping purposes.

The particular cushion cover herein illustrated for the purpose of describing the invention, is shown applied to the seat and back cushions or surfaces of an automobile. Other surfaces such as the back of the seat, the arm rests, and other parts also may be covered. Also, other articles, such as chairs or sofas may have the cover applied thereto.

The cover 1 of the invention may comprise only a seat cover part 2, or it may comprise both the seat cover 2 and a back cover 3. The seat cover parts 2 and 3 may be separate parts, or they may constitute a single element. If a single element, the parts may be integral as shown in Figs. 3, 4 and 5 and have a hinge line or "break" 4, or a "tuck-in" part 5, Fig. 3, which extends in, or over, the joint between the lower edge of the back 6 and the rear of the seat 7.

The cover 1 has an extension or strip 8 attached peripherally, or adjacent the periphery, of one or more sides or edges of the cover so as to extend outwardly from the cover and extend over a part of the cushion for attachment thereto. This extension 8 preferably is made from a fabric material which is different from the material of which the cover 1 or the cushion covering is made. The material of which the extension 8 is made is preferably light weight, relatively thin, cotton fabric, although any other kind or type of material may be used which will accomplish the results intended. The strip or extension 8 is secured to the cover in any suitable and economical manner, such as sewing, stitching or otherwise. An adhesive 9 is carried by the underside of the strip or extension 8 and is adapted to be stuck to the underside of the seat or back covering.

The adhesive coated strip 8 which may be made in parts or sections normally is adapted to be folded so as to lie flat against the underside of the cover 1 to permit ease in handling, shipping and packaging, the strip 8 being folded or tucked against the back of the cover, as shown clearly in Fig. 7. A covering strip 10, of light weight inexpensive gauze, fabric or other material, is applied over the adhesive to protect the adhesive, and to prevent the adhesive from sticking to the back of the part of the cover to which the strip 8 is secured, Figs. 5 and 6.

The strip 8, with its adhesive coating 9, projects outwardly in the form of an apron, and it projects outwardly along one or more peripheral side ends or edges of the cover to provide sufficient bonding area to be stuck to the cushion covering.

The cover of the invention, therefore, provides a cover for the seat and back, and other parts to be covered. The cover is applied by first pulling the adhesive covered strip 8 away from the underside of the cover and then removing the protective strip 10 so as to bare the adhesive. The cover is applied in position over the cushion and then the adhesive face 9 of the apron-like strip is pressed against the outer surface of the cushion, the cover then being held in position by the adhesive on the binding strip 8.

The adhesive coating 9 is of a material which will not run, or become sticky, or injure the fabric, or other covering of the cushion to which the cover is applied. The cover may be removed at any time by merely pulling the adhesive surfaced strip away from the cushion covering, and the cover again may be re-applied in the same manner in which it was originally applied. Because of the kind and type of adhesive used, and the manner in which it is applied to the binding strip 8, none of the adhesive material will come off the strip and stick on to the cushion covering. The cushion covering, therefore, is left unharmed, uninjured and undamaged and is left clean and unmarked.

In some instances, and for some purposes, it may be desirable to apply the pressure sensitive adhesive material 9 directly to the underside of the cover parts 2 and 3, whereupon the cover is first positioned in place and then the adhesive part is pressed against the cushion part. In this latter case, the protective covering strip 10, also is applied over the adhesive surface. Moreover, in cases when an apron is formed as a part of the cover itself, the adhesive may be applied directly to the underside of the apron. It is believed desirable, however, to apply the adhesive binding material to a strip 8 and attach the strip to the outer edges of the cover.

The invention provides a cover which carries its own attaching and securing means to permit the cover to be attached and maintained in place and to permit easy and quick removal, as, and when desired. The pressure sensitive adhesive 9 is fully protected by a strip 10 which is easily and quickly removed for placement of the cover on the cushion. The use of the product of the invention permits cushion covers to be made economically and makes it easy for the unskilled person or owner of the car, or article, to apply and remove.

In cases where the seat cover includes a cover for the back, the peripheral attaching strip 8 preferably extends from the side ends or edges a distance sufficient to apply the strip to adjacent parts of the cushion beyond the actual used cushion part whereby the strip will be out of contact with the body of the person. The economical manner of making the cover, and the quick and easy way in which the cover may be applied and removed, constitutes the major improvement of the invention. No snap fasteners or securement means, other than the adhesive surface, is required to hold the cover in its cushion covering position.

Changes may be made in the form, construction and arrangement of the parts without departing from the spirit of the invention or sacrificing any of the advantages thereof, and the right is hereby reserved to make all such changes as fairly fall within the scope of the following claim.

The invention is hereby claimed as follows:

A cover made of a material to overlie and cover a part of a member having a seat part to support the body of a person, a flexible thin extension on the separate peripheral edge of each end and the front of the cover to project from the seat part, pressure sensitive adhesive material on the underside of each separate extension to stick the extension to a part of the member adjacent the seat part to hold the cover in position on the seat part, and thin flexible strip material overlying the adhesive material on each extension to protect said adhesive material, said latter strip being adapted to be removed from the adhesive material to bare the adhesive material for application to a part of said member.

ALEX PUCHALSKY.

REFERENCES CITED

The following references are of record in the file of this patent:

UNITED STATES PATENTS

| Number | Name | Date |
|---|---|---|
| 2,193,410 | Schubert | Mar. 12, 1940 |
| 2,228,948 | Field | Jan. 14, 1941 |